June 15, 1926.
R. TOSSELL
1,588,507
BUMPER FOR MOTOR VEHICLES
Filed March 11, 1925  2 Sheets-Sheet 1
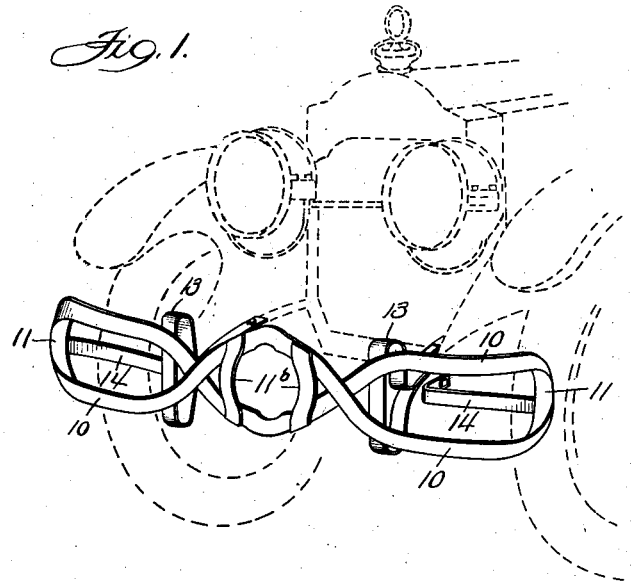
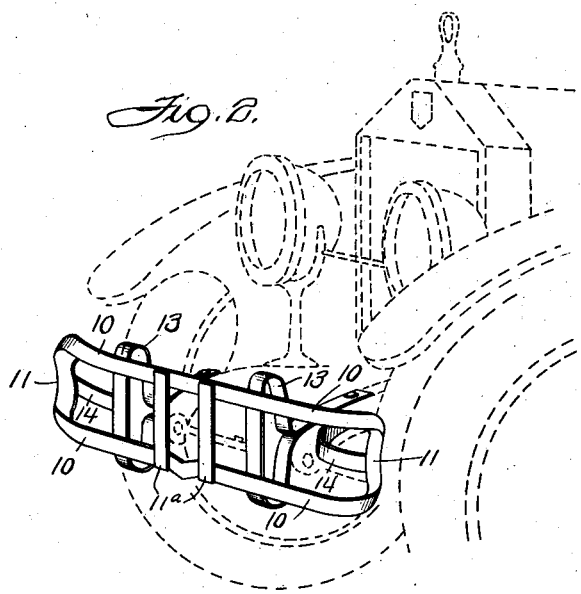
Inventor:
RICHARD TOSSELL
By Jones, Addington, Ames & Seibold
Attys.

June 15, 1926.  1,588,507
R. TOSSELL
BUMPER FOR MOTOR VEHICLES
Filed March 11, 1925    2 Sheets-Sheet 2
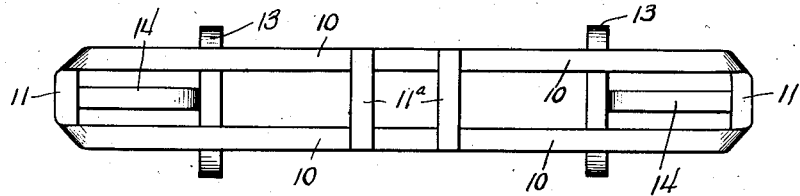
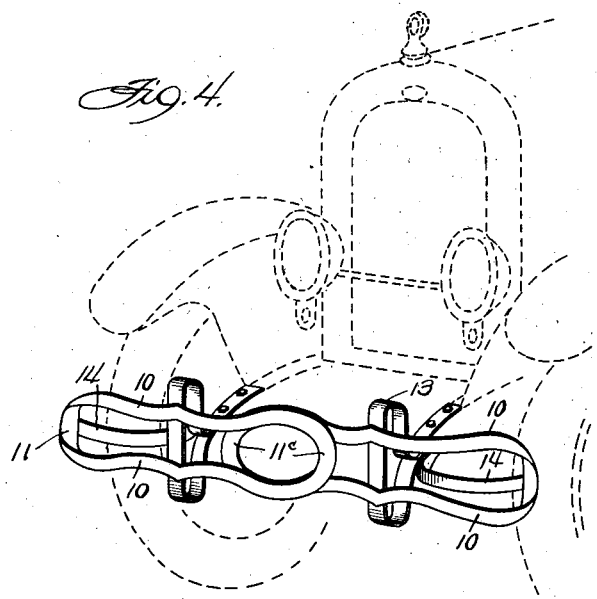
Inventor:
RICHARD TOSSELL
By Jones, Addington, Ames & Seibold
Att'ys.

Patented June 15, 1926.

1,588,507

UNITED STATES PATENT OFFICE.

RICHARD TOSSELL, OF CHICAGO, ILLINOIS.

BUMPER FOR MOTOR VEHICLES.

Application filed March 11, 1925. Serial No. 14,606.

The invention of this application, which is a continuation in part of my application, Serial No. 491,411, filed August 11, 1921, in so far as common subject matter is concerned, relates to bumpers for automobiles and consists of improvements whereby efficiency of protection, cheapness of manufacture and enhancement of appearance are secured.

The bumper is preferably of the double bar type, in which the bars are flat metal strips of suitable material and of sufficient size and strength for the purpose. The ends of the bumper are preferably formed by folding the horizontal or longitudinal members more or less diagonally over and back, whereby graceful curves are imparted to the ends and corners of the bumper, and the horizontal bars are connected by a substantially vertically extending integral continuation thereof.

While the bumper is ornamental as a whole, I prefer to shape or form the intermediate portion of the bumper into a fanciful design, and I prefer also that this fanciful design be made to correspond with and thus to simulate the distinctive lines, name plates or insignia of the particular cars with which the bumpers are to be used, whereby the bumper harmonizes with the car as a whole in fitting and appearance.

Referring to the accompanying drawings:

Figure 1 is a perspective view of the front end of the automobile with one form of the bumper attached;

Figure 2 is a similar view of another automobile with a bumper attached having a different conformation;

Figure 3 is a front elevational view of the same general type of bumper detached from the car;

Figure 4 is a perspective view of the front end of an automobile equipped with a different form of a bumper.

Referring now to various figures, the bumper comprises the two vertically separated horizontal bars 10, preferably of flat steel, having their outer ends slightly curved to the proper or desired contour to give, as shown in Figure 2, a slight rearward bend to the ends of the bumper; and the bars are then folded or bent over to the rear on diagonal corner curves to form the end pieces 11, which thus form vertical integral end connections between the upper and lower bars, and thus produce gracefully curved ends for the bumper as a whole. The bending may be readily accomplished over suitable forms when the material is heated.

As shown in the various figures of the drawings, the horizontal bars, together with the folded end connections, may by welding or otherwise be formed into an integral and endless looped member.

These horizontal bars may extend straight across from end to end of the bumper as in Figure 3, or be vertically bent or crossed in various ways, as, for example, in Figure 1, to give the bumper any desired form or appearance. I preferably also so shape or form these horizontal bars in their medial portion as to simulate a fanciful design and preferably to correspond to and follow the distinctive lines of the front end of the particular cars, or the name plates or insignia thereof, with which they are to be used, and attach to the medial parts of said bars 10 which are in the same vertical plane other metal pieces, such, for example, as the vertical strips $11^a$, Figures 2 or 3, or $11^b$, Figure 1, to complete the designs, lines, plates or insignia, whereby an ornamental and distinctive appearance is imparted to the bumper and car. The strips $11^a$, or $11^b$, or any others which may be so applied, serve also to brace and strengthen the bars and consequently afford better protection.

In Figure 4, a different configuration of the longitudinal bars and a different way of forming the inner ends of the bumper sections is illustrated. Here the longitudinal bars are curved by edgewise bending them as shown, and their inner ends are bent edgewise into an integral loop and welded together as at $11^c$; the two loops being overlapped and secured together as by riveting, bolting or clamping, form an elliptical shaped figure at the middle of the bar, which may conform to the name plate or insignia of the car. The vertical connecting portions of the bars may also be bent edgewise somewhat between the diagonal or oblique end folds as is shown at 11 in Figure 2.

These bumper bars are preferably supported from the projecting ends of the channel side bars of the car, by vertical spring loops 13 which are bolted or otherwise secured to the car. These loops also are preferably formed of flat spring bars and extend slightly above and below the bumper bars, to which they are secured by bolts or rivets or as desired.

The extreme ends of the bumper also are preferably supported from the side frames of the car by curved braces 14, of flat steel bars, bolted, riveted or clamped flatwise at one end to the rear face of the ends 11 of the bumper, and at the other end to the side frames of the car chassis.

While I have thus particularly described several different forms of my invention, it will be understood that various changes and alterations therefrom may be made without departing from the scope and principle of the same as set forth or intended to be set forth in the appended claims.

Having thus described my invention, what I claim as new and desire to secure by Letters Patent in the United States, is:—

1. A bumper member formed of relatively wide and thin strip metal bent and welded to form a closed integral loop embodying a pair of substantially horizontally extending vertically wide bars spaced vertically in alignment and integral end connecting means.

2. A bumper impact member having connector portions and a plurality of vertically aligned and vertically relatively wide impact receiving bars welded and bent to form a closed integral loop with the connector portions.

3. The automobile bumper element comprising an endless strip of relatively wide and thin material having vertically displaced portions and interposed connector portions of the strip having junction folds extending angularly across the strip.

4. The automobile bumper element comprising an endless strip of relatively wide and thin material having vertically displaced portions and interposed connector portions of the strip having junction folds extending angularly across the strip, and joining said vertically displaced portions without substantial edgewise bending.

5. A vehicle bumper member comprising a pair of vertically spaced bars extending integrally across from end to end of the bumper, said bars having substantially flat impact receiving faces, and connecting means at the ends of the bumper integral with both of said bars.

6. A vehicle bumper member comprising a pair of vertically spaced bars extending integrally across from end to end of the bumper and having superposed rearwardly curved portions at their ends, said bars having substantially flat impact receiving faces, and connecting means at the ends of the bumper comprising bent over extensions integral with both of said bars.

7. A vehicle bumper member comprising a pair of vertically spaced bars extending integrally straight across from end to end of the bumper, said bars having substantially flat impact receiving faces, and connecting means at the ends of the bumper integral with both of said bars.

8. A one-piece vehicle bumper member comprising a pair of vertically spaced bars extending straight across from end to end of the bumper, said bars having substantially flat impact receiving faces, and connecting means at the ends of the bumper comprising bent over extensions integral with both of said bars.

9. A one-piece automobile bumper front member comprising a pair of vertically aligned vertically displaced laterally extending bumper front bars formed of relatively wide steel strip and each having at each end integrally connected obliquely folded connector portions forming the lateral ends of the bumper front member.

10. A bumper front consisting of two flat metal bars extending substantially horizontally and transversely of the vehicle, said bars being connected at their outer ends by vertically extending portions formed by folding the bars flatwise obliquely to the horizontal bars, said bars and connecting portions comprising an endless strip forming a closed loop.

11. A two-bar bumper front for vehicles comprising two end portions welded together at their inner ends to form a complete bumper impact member, each of such end portions comprising two vertically spaced flat metal bars connected at their outer ends by integral portions formed by obliquely folding the bars.

12. An automobile bumper comprising a duplex impact member consisting of two spring bars extending integrally and transversely from end to end of the bumper and set vertically edgewise in substantially the same vertical plane and spaced apart in that plane, both said bars being reflexed rearward at both ends to form end loops for guarding the vehicle wheel, the two bars being integral throughout said loops, being flexed vertically to merge with each other at the inner ends of the loops.

13. An automobile bumper comprising a duplex impact member consisting of two spring bars extending integrally and transversely straight across from end to end of the bumper and set vertically edgewise in substantially the same vertical plane, both said bars being reflexed rearward at both ends of the bumper, the upper bar portion then extending downwardly and the lower bar portion similarly extending upwardly and meeting said upper bar portion.

14. A bumper member comprising an endless spring strip formed substantially into the shape of an elongated four-sided figure, the opposite sides of which are set vertically edgewise in substantially the same vertical planes, the front faces of each side of the figure comprising continuations of the rear strip surfaces of the adjacent sides of the figure.

15. The combination with an automobile frame, of an endless steel rod forming an elongated bumper bar loop with upper and lower members in approximately the same vertical plane, connected in their central region by cross bars and having their end portions bent toward the frame, and supporting flat spring arms each being connected to said region of the loop and having its opposite end clamped to said frame.

In witness whereof, I have hereunto subscribed my name.

RICHARD TOSSELL.